Nov. 1, 1938.  A. T. SCHEIWER  2,135,221

COUPLING

Filed Jan. 6, 1936  2 Sheets-Sheet 1

INVENTOR.
Albert T. Scheiwer
BY
Florian J. Miller
ATTORNEY.

Nov. 1, 1938.　　　A. T. SCHEIWER　　　2,135,221
COUPLING
Filed Jan. 6, 1936　　　2 Sheets-Sheet 2
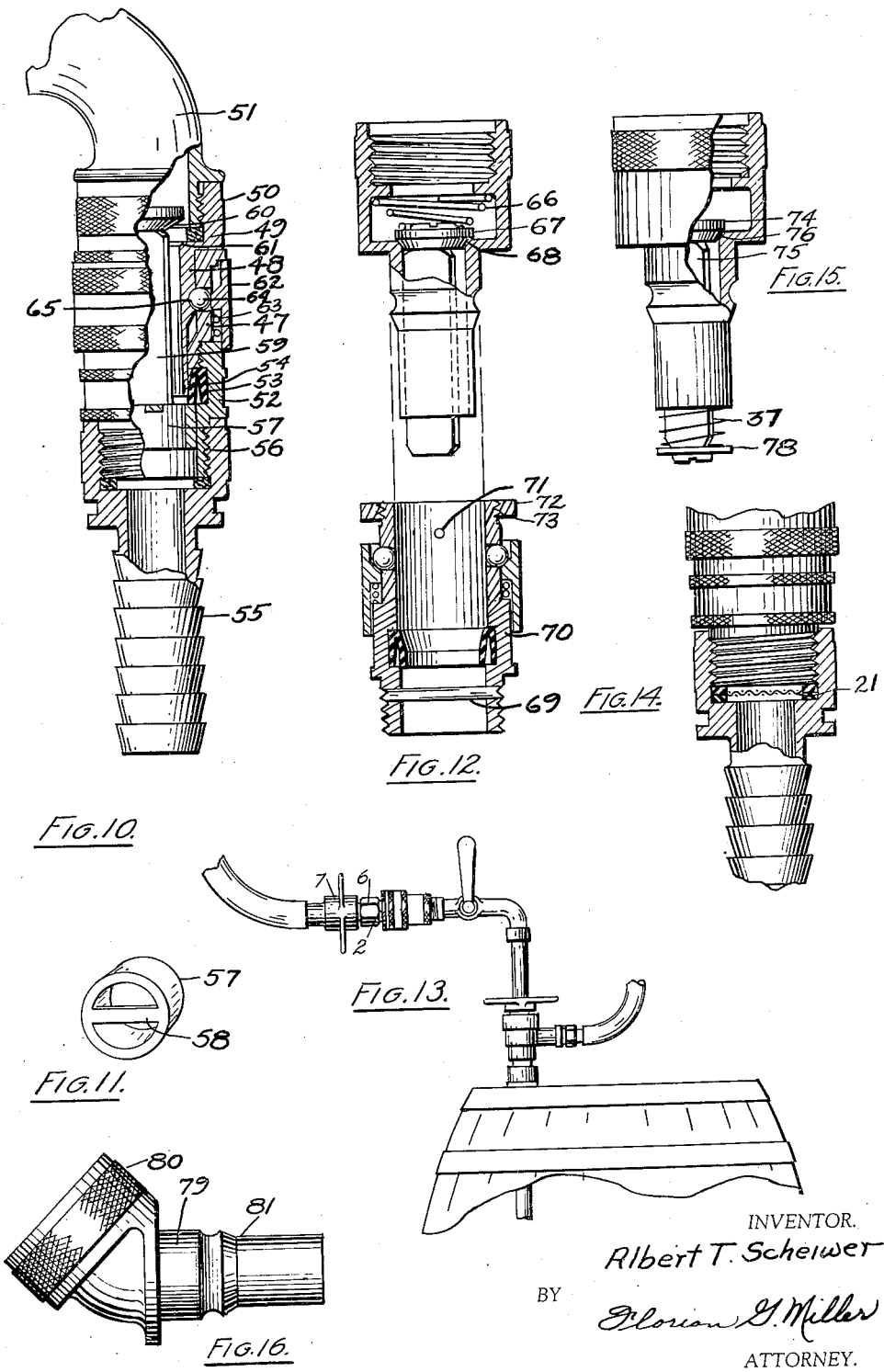
INVENTOR.
Albert T. Scheiwer
BY
ATTORNEY.

Patented Nov. 1, 1938

2,135,221

UNITED STATES PATENT OFFICE 2,135,221

COUPLING

Albert T. Scheiwer, Erie, Pa.

Application January 6, 1936, Serial No. 57,712

4 Claims. (Cl. 284—19)

This invention relates to couplings, and more particularly to quickly detachable couplings having check valves combined therewith.

All devices of this character made according to the prior art and with which I am familiar, have not been provided with check valves which operate automatically upon the disconnection of the coupling to check the flow of fluid. This operation heretofore has always required manual intervention.

It is, accordingly, the principal object of my invention to provide a quickly detachable coupling which has a check valve combined therewith to automatically check the flow of fluid passing therethrough upon the disconnection of the coupling.

Another object of my invention is to provide a novel and simple construction for quickly detachable couplings having check valves combined therewith.

Another object of my invention is to provide a check valve in combination with a quickly detachable coupling which is simple in construction, economical in manufacture, and automatic in operation.

Another object of my invention is to provide a check valve in combination with a quickly detachable coupling which permits the free flow of fluid when the coupling is in connected position and checks the flow of fluid automatically when the coupling is in disconnected position.

Another object of my invention is to provide readily replaceable washers in a quickly detachable coupling having a check valve combined therewith which may be quickly and easily replaced and which provide a perfect fluid seal.

Another object of my invention is to provide a quickly detachable coupling having a check valve combined therewith which is adapted to swivel.

Another object of my invention is to provide a quickly detachable coupling having a check valve combined therewith which has a male member which is adapted to rotate relative to the female member thereof while maintaining a fluid seal.

Other objects of my invention will become evident from the following detailed description, taken in conjunction with the accompanying drawings, in which—

Fig. 10 is a view in side elevation partly in cross-section of my quickly detachable coupling combined with a check valve for use on a faucet with a hose connection.

Fig. 11 is a perspective view of the stop member for the check valve stem used in the assembly of Fig. 10.

Fig. 12 is an exploded view partly in cross-section of my coupling showing the stop member for the check valve stem fixedly connected to the outer walls of the section.

Fig. 13 is an assembly view of my coupling used in connection with beer dispensing apparatus.

Fig. 14 is a medial sectional view of the attaching section shown in Fig. 1 with a screen assembled therein.

Fig. 15 is a side elevational view partly in cross-section of the male member of Fig. 4 provided with a spring member.

Fig. 16 is a side elevational view of a male coupling member presenting its attaching portion at an angle to the axis of the connecting portion of the male member.

Figure 1:
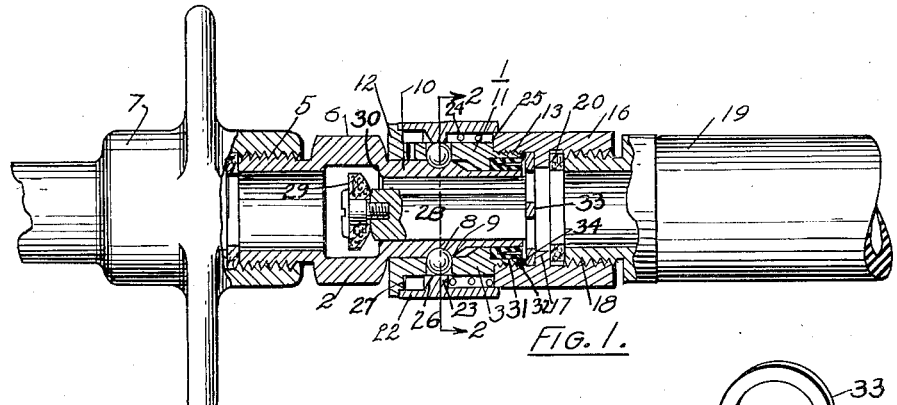
Fig. 1 is a side elevational view partly in section of my novel quickly detachable coupling combined with a check valve in connected position with the passages free.
Figures 2, 3, 5, 6:
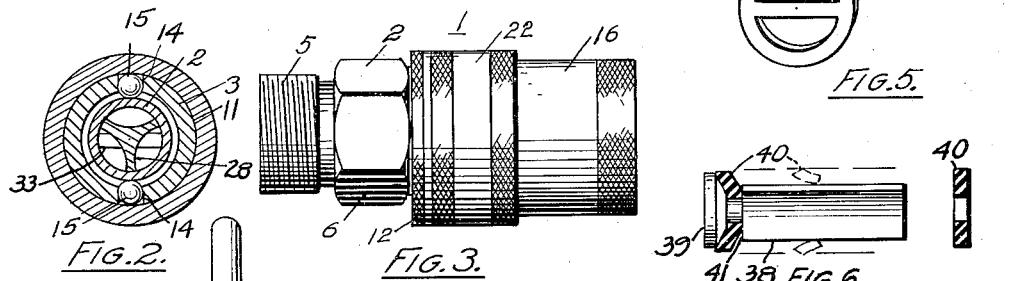
Fig. 2 is a cross-section taken on the line 2—2 of Fig. 1.
Fig. 3 is a side elevational view of the coupling shown in Fig. 1 without connections attached thereto.
Fig. 5 is a perspective view of the stop member for the check valve stem.
Fig. 6 is a side elevational view of a modified form of check valve stem with the washer in three different positions.

Referring to the drawings, the coupling 1 in Figs. 1 and 3 comprises a male member 2 and a female member 3 shown in connected position. The male member 2 (Fig. 4) is substantially tubular in form and has a reduced end portion 4. The outer portion 5 of the male member 2 is threaded and the portion 6 adjacent thereto is formed so that a wrench may be applied thereto to connect the outer threaded portion 5 to any form of connecting member such as a connecting member 7 shown in Figs. 1 and 4. A peripheral groove 8 and a shoulder 9 adjacent thereto is formed on the connecting portion 10 of the male member 2.

The female member 3 comprises a substantially tubular section 11 having a radially extending flange 12 on one end thereof and a reduced threaded portion 13 on the other end thereof. Radially extending apertures 14 in the section 11 are restricted at the inner edge thereof to prevent ball members 15, which are carried in the apertures 14 and move radially therein, from falling through the apertures 14 when the male member 2 and the female member 3 are not in connected position. The ball members 15 engage the grooved portion 8 on the male member 2 when in the connected position as shown in Fig. 1 to provide a securely connected coupling.

An internally threaded connecting section 16 having an intermediate internal shoulder 17 engages the reduced threaded portion 13 on section 11 and the other end thereof is internally threaded as at 18 to receive a hose or pipe connection 19. The washer 20 is inserted between the shoulder 17 and the end of the pipe connection 19 to provide a fluid seal. Fig. 14 shows the connecting section 16 with an easily removable screen 21 to provide screening of the fluid passing through the coupling 1 in certain installations. A sleeve 22 having an inner depending portion 23 bearing on the outer periphery of the tubular section 11 is telescopically disposed on the sections 11 and 16 and is urged forwardly against the flange 12 on the section 11 by the coil spring 24 which is disposed between the end 25 of the connecting section 16 and the depending inner portion 23 on the sleeve 22. The normal position of the sleeve 22 as shown in Fig. 1 is with the depending portion 23 directly over the apertures 14 containing the ball members 15 which engage the groove 8 on the male member 2 to secure the male member 2 in locked connecting relation with the female member 3. The ball members 15 move radially inwardly and outwardly but are held against outward movement by the depending portion 23 of the sleeve 22 when in a locked position as in Fig. 1. The depending portion 23 is normally tapered as at 26 to provide a camming action on the ball members 15 when the sleeve 22 moves forward, this camming action forcing the ball members 15 inwardly into the groove 8 thereby locking the male member 2 and the female member 3 together. Upon the longitudinal movement of the sleeve 22 against the force of the spring 24 tending to maintain the coupling in a locked relation, the depending portion 23 is moved away from the apertures 14 permitting the ball members 15 to move radially outwardly and freeing the male member 2 thereby disconnecting the male and female members 2 and 3. A shoulder 27 is formed adjacent the flange 12 on the section 11 to provide a support for the forward end of the sleeve 22 when in its normal position as in Fig. 1, the other end being supported by the section 16 over which sleeve 22 moves.

Figures 4, 7, 9:
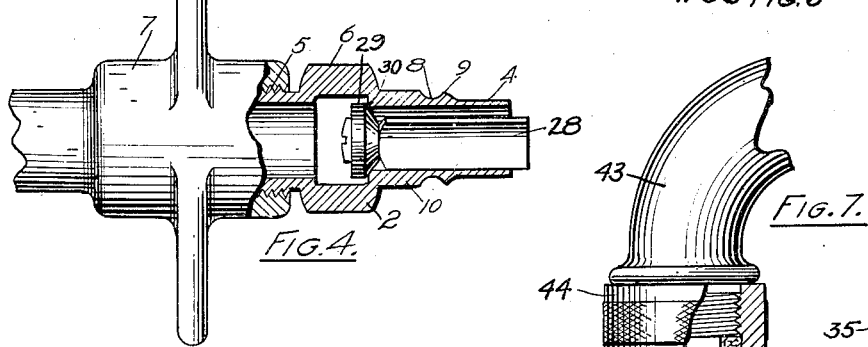
Fig. 4 is a side elevational view in cross-section of the male member of the coupling shown in Fig. 1.
Fig. 7 is a side elevational view partly in cross-section of an alternative form of male coupling member without a check valve combined therewith which may be used with the female coupling member of Fig. 1.
Fig. 9 is a cross-sectional view of the U-shaped washer used in my coupling.

A check valve combined with the male and female members 2 and 3 comprises a valve stem 28 disposed in the male member 2 having a tapered head 29 which seats on a valve seat 30 formed in the bore of the male member 2. An inner grooved portion 31 in the reduced portion 13 of the section 11 receives a U-shaped washer 32 as shown in Fig. 9 which contacts the reduced end portion 4 of the male member 2 to provide a fluid seal. A stop member 33 shown in Fig. 5 is disposed adjacent the inner shoulder 17 of the connecting section 16 and is held thereagainst by the engaging threaded portion 13 on the section 11 with an intermediate washer 34 provided to prevent leakage. The U-shaped washer 32 has an internally tapered portion 35 where the reduced portion 4 of the male member 2 enters to permit a perfect sealing connection to be made with the least amount of wear on the washer 32 and the reduced portion 4 of the male member 2. Only the extreme end of the reduced portion 4 of the male member 2 comes in contact with the portion 36 of the washer 32 which is not tapered providing a perfect fluid seal.

In operation, the sleeve 22 is moved longitudinally against the force of the spring 24 permitting the ball members 15 to move radially outwardly upon entrance of the male member 2 into the female member 3. The reduced portion 4 on the male member 2 will ordinarily not come in contact with the ball members 15 thereby eliminating any wear due to friction between portion 4 and members 15. When the groove 8 on the male member 2 is aligned with the apertures 14 in the tubular section 11, the sleeve 22 is released and the spring member 24 urges the sleeve 22 forwardly thereby causing the tapered portion 26 of the depending portion 23 to force the ball members 15 radially inwardly in contact with the groove 8 on the male member 2 resulting in a connection which permits the male member 2 to rotate as a swivel without any leakage resulting therefrom. Upon the connection being made, the valve stem 28 moves longitudinally upon contact with the stop member 33.

The longitudinal movement of the valve stem 28 moves the head 29 thereof away from its seat 30 in the male member 2 upon contact with the stop member 33 as shown in Fig. 1 to permit the free flow of fluid as long as the connection of the male and female members 2 and 3 is made. When the male and female members 2 and 3 are disconnected, the head 29 seats on the valve seat 30 as shown in Fig. 4 providing a check on the fluid passing therethrough. The pressure in the line normally will force the seating of the head 29 on its seat 30. Spring members 37 and 66 shown in Figs. 12 and 15 may be provided to normally urge the seating of the seating surface of the valve stem upon disconnection of the male and female members. It will be evident that any form of washer or gasket may be used for sealing purposes in place of those disclosed.

Fig. 6 shows a modified form of valve stem 38 having a head 39 in which the stem 38 and head 39 is formed in one piece of a ferrous or non-ferrous material and a gasket 40 is fitted into the groove 41 extending over the seating surface of the head 39. In this type of valve stem and head, only the washer or gasket 40 need be replaced as this is the principal wearing surface and one which must be kept in perfect condition at all times to provide a perfect seal.

Figure 8:
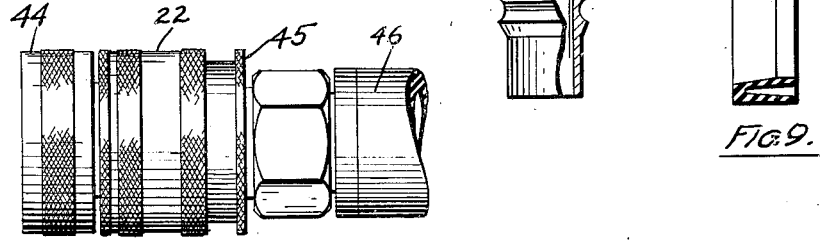
Fig. 8 is a side elevational view of the female coupling member of Fig. 1 with the male member of Fig. 7 attached thereto and a modified form of connecting section on the other end thereof.

Fig. 8 shows a modified form of construction in which the tubular section 11 of Fig. 1 and the sleeve 22 movable thereon is used with a male member 42 shown in Fig. 7 attached to a faucet 43, the head 44 of the male member 42 being internally threaded for this purpose. Instead of the connecting section 16 of Fig. 1, a plain connecting section 45 presenting an externally threaded portion for attachment of a hose or pipe 46 is threadably engaged to the reduced threaded portion 13 of the section 11. This assembly has no check valve but merely provides another form of coupling using interchangeable parts.

Fig. 10 shows a coupling having a female member 47 substantially the same as the female member 3 of Fig. 1 with the exception that the grooved portion 31 in the reduced portion 13 of the tubular section 11 in Fig. 1 is eliminated. The connecting portion 48 of the male member 49 is of the same construction as the connecting portion 10 of the male member 2 of Fig. 1 but an internally threaded head 50 is formed integral with the male member 49 for attachment to a faucet 51. The connecting section 52 has an interior grooved portion 53 for the insertion of a U-shaped washer 54. A serrated connecting portion 55 is threadably engaged to the externally threaded outer end 56 of the connecting section 52. The serrated connecting portion 55 is used for attaching hose (not shown) and the like. A sleeve 57, shown in Fig. 11, having a stop member 58 formed integral therewith is inserted in the connecting section 52 to provide a stop for the valve stem 59 when the male and female members are connected together to permit the free flow of fluid because of the separation of the seating surface 60 of the valve stem 59 and the seat 61. A sleeve 62, coil spring 63, and ball members 64 of the female member 47 cooperate with the groove 65 on the male member 49 to make a quick connection the same as in the construction shown in Fig. 1.

Fig. 12 is a modification of the construction of Fig. 10 in that a spring 66 urges the valve stem head 67 against its seat 68 at all times and a stop member 69 is made integral with the tubular section 70 which has no connecting section as the connecting section 52 of Fig. 10. A spanner wrench aperture 71 is provided and the shoulder 72 threadably engages the threaded portion 73 of the tubular section 70.

Fig. 15 shows another form of spring assembly for urging the head 74 of the valve stem 75 against its seat 76 to assure the immediate checking of the flow of fluid upon the disconnection of the coupling. Coil spring 37 bears against a detachable shoulder 78 which may be integral with the stem 75, to force the stem 75 downwardly.

Fig. 16 shows a male member 79 for use with the female member 3 of Fig. 1 having the internally threaded head 80 thereof off-set at an angle of forty-five degrees from the axis of the connecting portion 81 of the male member 79. This construction causes less kinking of the hose when connected to some fixed connection such as a vertically disposed faucet.

It will be apparent that I have provided a coupling member in combination with a check valve having many novel features of construction and which provides an automatic check for fluids passing through the coupling upon disconnection of the coupling. A swivel joint connection is provided and the outer sleeve is also rotatable without causing a disconnection of the coupling. The coupling has an improved fluid seal, and the coupling may be manufactured, replaced, and assembled in the shortest possible time.

Various changes may be made in the specific embodiment of this invention without diverting from the spirit thereof, or within the scope of the present claims.

What I claim is:

1. A tubular coupling comprising a male member having a connecting portion with a peripheral groove, a valve member disposed in said male member to provide a seal therefor, a female member comprising a tubular section, a washer disposed in said female member for surrounding the connecting portion of said male member, a radially projecting portion internally of said female member engaging said valve member upon connection of said male and female members to permit the free flow of fluid therein, a collar on the end of said tubular section, and a sleeve held by said collar and surrounding said tubular section for normally holding said ball members in said groove on said male member to secure said male and female members together.

2. A tubular coupling as set forth in claim 1 wherein said collar is separable from said tubular section.

3. A tubular coupling as set forth in claim 1 wherein said washer is an annular member, U-shaped in cross-section, having a portion of the internal wall thereof tapered.

4. A tubular coupling as set forth in claim 1 wherein said tubular section is separable from the remaining portion of the female member thereby providing for insertion and removal of said washer.

ALBERT T. SCHEIWER.